United States Patent [19]

Loos et al.

[11] 4,119,014

[45] Oct. 10, 1978

[54] METHOD FOR PRECISION WORKING, PARTICULARLY SHAVING, OF GEARS

[75] Inventors: Herbert Loos, Dorfen; Manfred Heckmaier, Unterpfaffenhofen; Gerhard Reichert, Puchheim, all of Germany

[73] Assignee: Carl Hurth Maschinen- und Zahnradfabrik, Munich, Germany

[21] Appl. No.: 767,153

[22] Filed: Feb. 9, 1977

[30] Foreign Application Priority Data

Apr. 9, 1976 [DE] Fed. Rep. of Germany ....... 2615718

[51] Int. Cl.² ............................................. B23F 19/06
[52] U.S. Cl. ................................................... 90/1.6 R
[58] Field of Search .................. 90/1.6 R, 3; 51/52 R, 51/105 GG

[56] References Cited

U.S. PATENT DOCUMENTS

| | | | |
|---|---|---|---|
| 2,380,261 | 7/1945 | Praeg | 90/1.6 R |
| 3,213,754 | 10/1965 | Hurth et al. | 90/1.6 R |

*Primary Examiner*—Gil Weidenfeld
*Attorney, Agent, or Firm*—Blanchard, Flynn, Thiel, Boutell & Tanis

[57] ABSTRACT

A method for the precision working of gears, particularly by a gear shaving process. The method involves the step of changing the direction of rotation between the workpiece and the tool approximately starting with half of the advance path and the smallest distance between the axes. The optimum condition occurs when the direction of rotation is changed prior to reaching the smallest distance between the axes and the advance is directed at a right angle with respect to the axis of the workpiece or tool. The tool is rotatably supported on a spindle as is the workpiece. The workpiece is driven relative to the tool to advance same relative to the tool. Control devices are provided for controlling the movement of the workpiece relative to the tool. The tool has grooves which extend from the addendum to the dedendum and form cutting edges and the flanks of the teeth have concaved surfaces.

7 Claims, 5 Drawing Figures

METHOD FOR PRECISION WORKING, PARTICULARLY SHAVING, OF GEARS

FIELD OF THE INVENTION

The invention relates to a method for precision working, in particular precision shaving, of gears.

BACKGROUND OF THE INVENTION

The development of gear shaving (also gear honing) started with the so-called parallel shaving, this is a method, in which the advance or movement of the workpiece relative to the tool occurs with the axis of the tool extending parallel to the workpiece axis. For the purpose of the chip removal, the tool is moved in strokes relative to the workpiece. One started then to direct the relative advance of the axis of the tool angularly with respect to the workpiece axis, through which the operating time could be shortened and wherein the tool is worn more evenly because of the crossed-axes point wandering alongside of the tool teeth. In this method, which in the technical language is called diagonal shaving, the tool is also moved in strokes relative to the workpiece. During a further development, the direction of the advance was then swung so far that it was directed at a right angle with respect to the workpiece axis. A chip removal radially with respect to the workpiece axis (depth feed motion) no longer took place. The operating time was extremely shortened in this method which is called, in the technical language, underpass-shaving. In all abovedescribed methods there occurs a change in the direction of rotation of workpiece and tool at the end of the advance. (Hurth-gearshaving (1964)), Page 208 et seq.

Underpass shaving has led to a considerable reduction of the operating time, however, gears with an insufficient surface quality and with flank profile errors were produced. The latter were additionally worsened by being different on the right and left flank of the respective teeth. To reduce these deficiencies, one first varied the cutting speed and the advance speed, which was not sucessful. Then, during the course of a further development, a stepwise radial feed was introduced which, because of the time involved, was supposed to be avoided in particular by the underpass-shaving. Thus one fell back through the development of the underpass-method onto the diagonal method with stroke-like radial feed.

The basic purpose of the invention is to provide a method, which assures, on the one hand, the short operating time of the underpass-method, however, on the other hand, achieves a higher surface quality and tooth quality.

To attain this purpose, the inventors first examined the course of the chip removal during the advance, in particular by comparing the two sides of the workpiece teeth, namely during different advancing and cutting speeds, but this actually did not yet lead to any satisfactory result. Only an examination of the operations of the reciprocal action of flank and counterflank on the respective tooth side brought about the attainment of the set purpose.

The time period for the change in the direction of rotation exists inventively on the part of the advance path, on which chips are removed on both sides of the workpiece teeth. To determine the exact time period, one must note the geometry of the workpiece, the chip allowance, the workpiece width and the form of the elastic flattening, which in turn depends on the curvature radii of the tooth flanks, on the crossed-axes angle and contact pressure (see for this Hurth-gearing-shaving (1964) Page 220). The following tendency must be considered for the time period of the change in the direction of rotation. When the pitch diameter is large, the point of the change in the direction of rotation lies farther away from the point of the smallest axial distance (common normal line) of workpiece and tool than in the case of a small pitch diameter, similarly in the case of a large working tolerance. The exact point of the change in the direction of rotation is determined advantageously by operating tests.

Generally the method according to the invention is carried out changing the direction of rotation prior to reaching the smallest distance between axes. Only in cases of an exception is the direction of rotation supposed to change at the point of the smallest axial distance, however, the success of the invention can hereby be lost. In this connection the elastic flattening is again brought to mind. Optimum conditions are obtained by directing the advance at a right angle with respect to the axes of the workpiece or the tool. The advances must be varied under high quality requirements.

For high requirements concerning the quality of the toothing which is to be produced, it is of extreme importance to cause the return stroke to take place with reduced speed from the point of smallest distance between the axes to the point of approximate release of the tooth flanks. A reduction of the advance speed can exist from the start of the return stroke over the point of the smallest axial distance until the release of the tooth flanks from one another. Of a decisive influence is, however, the area from the point of the smallest axial distance to the release of the tooth flanks from one another. The type of this characteristic is connected with the elastic stresses which are stored during the working in the device and their release.

Of particular importance is the device for controlling the direction of rotation which is effective during the abovedescribed section of the advance. This device can consist substantially of cams and switches in the advance path or of a control roller or the like which runs synchronously with the advance or of a time relay which, starting out from a fix point of the advance, for example, the start of the same, causes after a predetermined time at a desired point of the advance the change of the direction of rotation. The device may also be a numerical or a different suited electric, hydraulic or pneumatic control.

In the case of high quality requirements, the speed (cutting speed) must also be changed dependent from the advance.

A tool for the method according to the invention is similar to the one for the known plunge-shaving method, however, differs inventively from same in that the curvatures in the longitudinal direction of the teeth do not cling to one another over the entire gear width.

The device for controlling any operations is not limited to the exemplarily mentioned types, but it is possible to use all suited mechanical, electric, hydraulic or pneumatic controls.

Further advantages and characteristics of the invention can be taken from the following description.

BRIEF DESCRIPTION OF THE DRAWINGS

The invention will be discussed in connection with FIGS. 1 to 5.

DETAILED DESCRIPTION

Figure 1:
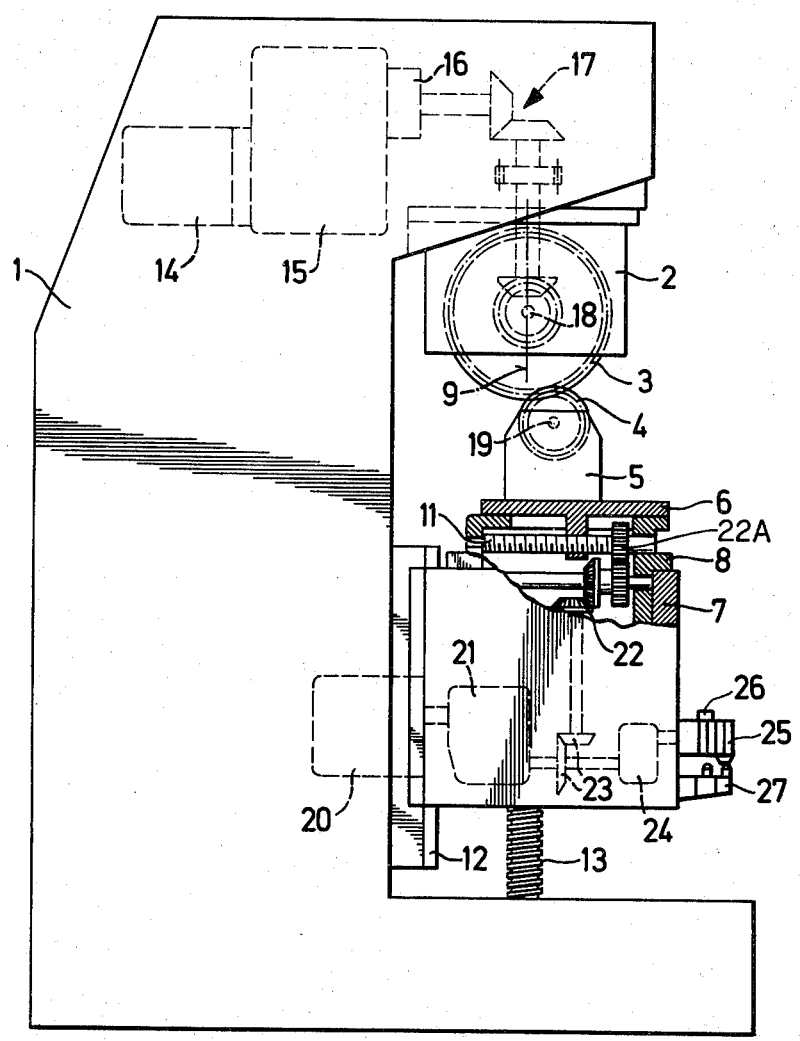
FIG. 1 is an example of a gear shaving machine for carrying out the method according to the invention.

The machine according to FIG. 1, on which the method according to the invention can be applied comprises substantially of a machine frame 1 which, in the example, is constructed as a co-called C-frame. The machine may, however, have any other suitable form. There is supported below the upper leg of the "C" a tool head 2 which is fixable and pivotal about a vertical axis. The tool, here a shaving gear 3, is rotatably and exchangeably supported in the tool head. The position of the shaving gear 3 is adjustable with the tool head 2 to a desired crossed axes angle θ (FIG. 2) with respect to the workpiece 4. The workpiece 4 is supported by means of tailstocks 5 or the like on a carriage 6 which is movably supported on a console 7 in a carriage guide 8. The longitudinal axis of the carriage guide 8 extends at a right angle to the pivot axis 9 of the tool head 2 and also at a right angle to the axis of the workpiece 4 or to the axis of the spindle which receives the workpiece.

The carriage guide need not be pivotal about a vertical axis for the invention, however, it may exist for the purpose of versatility of the machine.

The carriage 6 can be driven by an electric or hydraulic motor 20 via a stepped or stepless change speed and reversing transmission 21 and an angle drive gearing, e.g. a bevel gear set 23, 22 and a spur gear set 22 A by means of a feed screw 11. Connected with the lower angle drive gearing or bevel gear set 23 is a further gearing 24 serving to drive a control drum 25. This control drum is provided with a plurality of adjustable cams 26 arranged to trip switches 27. Because of a power train connection between the feed screw 11 and the control drum 25, the cams 26 are capable of giving feed-dependent signals for controlling the feed phases described in connection with FIGS. 2 and 3, which feed phases include increases and decreases in the velocity of the relative movement between the workpiece and the tool and also the direction of rotation of the motor 14 used for driving the tool 3.

Figure 2:
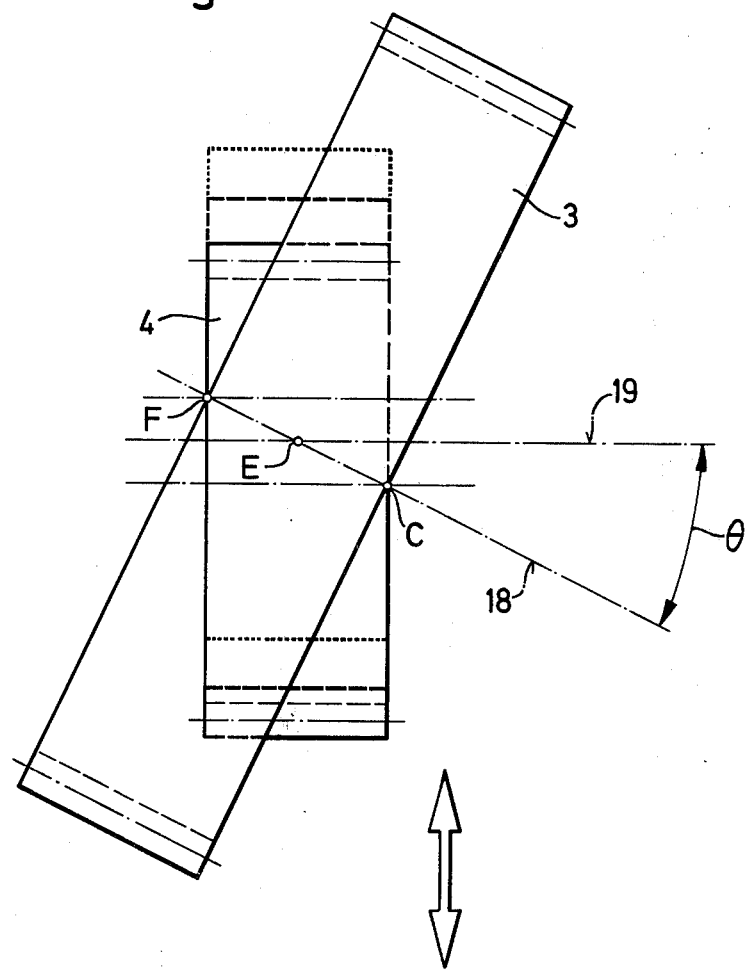
FIG. 2 is a schematical illustration of a tool and workpiece which carry out an advance relative to one another, just like in the so-called underpass method and in the inventive method. (Viewed from the tool onto the workpiece)
Figure 3:
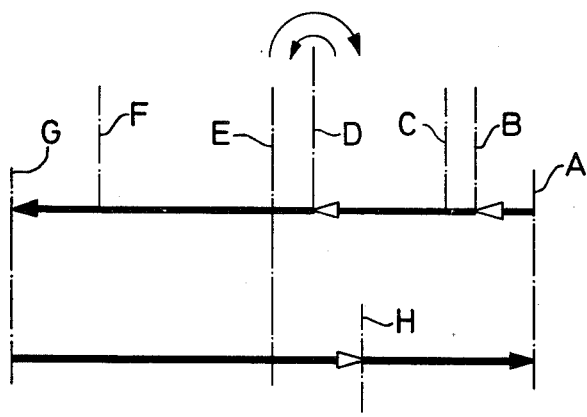
FIG. 3 is a schematical illustration of the sequence for the advance and return stroke in the method according to the invention. Different from the illustration in FIG. 3, the advance and the return stroke take place on the same line (in the same plane)

At the smallest space between the axes of the tool 3 and the workpiece 4 or the axes of the tool spindle and the workpiece spindle, the pivot axis 9 coincides with the common normal between the two axes of the tool and the workpiece (Point E in FIGS. 2 and 3). The console 7 is adjustably supported in height in a guideway 12 on the machine frame 1 and a drivable screw 13 is provided for this purpose.

An apparatus for a step-by-step or continuous chip supply radially with respect to the workpiece spindle is not provided for the invention, however, it can be provided for the purpose of the versatility of the machine.

The tool 3 is driven from a motor 14 through a transmission 15 and/or change gear system, a reversing gear 16 and angle drive gearing 17. The described drives are only mentioned exemplarily, it is also possible to provide other suitable types of drives, for example, hydraulic or pneumatic or other drives.

The shaving gear and the tool roll along one another during shaving, the advance starts, according to FIG. 1, on the right side of the shaving gear 3 and with a loose tooth engagement, extends toward the left through the common normal line 9 position until the advance ends on the left side of the tool, right side of the workpiece 4; the workpiece 4 is thereafter returned to the right to the starting point of the advance. Control impulses are thereby given inventively, which will be described more in detail hereinbelow. The control means like cams, switches, cam drums, NC-controls and the like are known and, therefore, not shown and described. For the invention, it is only of importance at which place on the advance path and with which action the control means work.

FIG. 2 schematically illustrates the advance path of the workpiece 4 relative to the tool (shaving gear 3) in the known underpass-shaving and at the same time in the inventive method. The axis 18 of the tool spindle crosses the axis 19 of the workpiece spindle with the so-called crossed-axes angle θ. At the start of the advance with a clearance-free mating, the crossed-axes point C lies on the right sides of the workpiece and the tool (workpiece 4 is shown in full lines). During a further advance, the workpiece axis crosses the condition of the smallest distance between axes. The crossed-axes point E coincides with the common normal line 9 (in the case of workpieces with or without symmetric width camber point D lies in the gear center). The shifted position of the workpiece is shown with broken lines in FIG. 2. The condition of the clearance-free mating ends when the crossed-axes point F lies on the left front sides of the tool and the workpiece. The further shifted position of the workpiece is shown with dotted lines. Due to the fact that the crossed-axes point moves over the entire width of the tool, same is evenly machined.

Decisive for the success of the process is the place at which the direction of rotation and furthermore the speed of the advance is changed. These operations are discussed in connection with the diagram of FIG. 3. In FIG. 3 it must be noted that the line curves for advance and return stroke are superposed on one another in reality.

The advance of the workpiece 4 relative to the tool 3 (FIGS. 1 and 2) starts at point A (FIG. 3) with a loose engagement between the teeth and at a fast speed. Shortly before the teeth start to mate without clearance therebetween, the advance is reduced to the operating speed at point B. Chip removal starts at point C and with a clearance-free engagement on both sides of the workpiece teeth. After the crossed-axes point has covered half of the path to the crossed-axes point E on the common normal line, the direction of rotation of the tool is changed at point D. For this purpose, the advance or position of the workpiece remains for a predetermined time at point D. If the change in the direction of rotation occurs too late, then already in the first direction of rotation so much material would be shaved off from the workpiece flanks that, for the second direction of rotation, sufficient machining allowance no longer exists in order to compensate for the errors generated in the first direction of rotation. The advance or movement of the workpiece passes then through the point E whereat the smallest distance between axes exists to the point F whereat the tooth flanks start to separate from one another. The advance terminates at point G. The return stroke takes place with the same direction of rotation differing from the known methods. Two alternatives can be provided for the return stroke. Either the return stroke extends from point G to H, a point on the other side of E, with reduced return stroke speed or the return stroke takes place first with the same speed as the advance up to point E. Approximately at point E the return stroke is then reduced to a greatly reduced speed so that the stresses which are stored in the device (machine) during the working and elastic deformations have time to release. The operation of the release of the stresses terminates at point H and the return stroke is switched over to a rapid-return motion. The operation terminates at point A.

The release of stresses is of determining importance for the surface quality of the workpiece teeth and has, therefore, also importance for the conventional so-called underpass-shaving.

Figure 4:
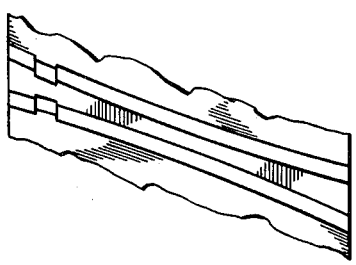
FIG. 4 is a shaving gear tooth having a spherical concave flank surface in longitudinal direction. Only one cutting groove of one whole row is shown per tooth side, viewed onto the tooth addendum.
Figure 5:
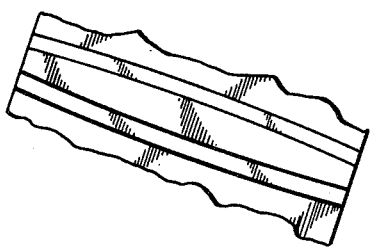
FIG. 5 illustrates spherical convex flank surface on a workpiece tooth, viewed onto the tooth addendum.

FIG. 4 schematically illustrates an example of a tool tooth having spherical concave flanks extending in the longitudinal direction. This hollow camber or concave surface is needed for both workpieces with teeth which have parallel flank lines (no camber) and also for workpieces with spherical convex flanks on the teeth (FIG. 5). It is important for the invention that the hollow camber does not engage over the entire tooth width to the workpiece. Otherwise, no distinct crossed-axes point (like for example during plunge shaving) would be obtained and it would not be possible to define a certain point D on the advance path for changing the direction of rotation.

With respect to the diagram of FIG. 3, it must be stated additionally that the advance speed from D to G can be quicker than from C to D. F may coincide with G. The return stroke speed from G to E can practically be any speed, for example as fast as from D to G. However, it is important to have a very slow speed from E to H.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a method for the precision working of gear-shaped workpieces utilizing a gear-shaped tool, wherein crossed axes exist between said tool and said workpiece, wherein said tool and said workpiece are moved relative to each other in one single selectable plane which extends at a right angle to a common normal line at the smallest distance between the axes of said workpiece and said tool, the improvement comprising the steps of driving one of said tool and said workpiece for rotation in a first direction of rotation and simultaneously moving said tool and said workpiece toward each other in said single selectable plane to effect an initial engagement of the teeth on said tool and said workpiece at a first location in the path of said relative movement and the beginning of removal of material from said workpiece, reversing the driving direction of rotation of said one of said tool and said workpiece to a second direction of rotation at a second location in the path of said relative movement that is intermediate said first location and a third location defining the smallest distance between the axes of said tool and said workpiece, said second location being between more than half the distance between said first and third locations and less than total distance between said first and third locations.

2. The improved method according to claim 1, wherein the direction of rotation is changed prior to reaching the smallest distance between axes.

3. The improved method according to claim 1, wherein said relative movement between said tool and said workpiece is in a direction which is at a right angle with respect to the axis of said one of said workpiece and said tool.

4. The improved method according to claim 1, including the following method steps:
   a. relatively moving said tool and said workpiece during a loose tooth engagement at a first velocity;
   b. relatively moving said tool and said workpiece during a chip removal on both tooth sides of said workpiece at a second velocity less than said first velocity;
   c. halting said relative movement during an adjustable time period, simultaneously with said change of the direction of rotation of said one of said tool and said workpiece for a predetermined time interval;
   d. thereafter continuing said relative movement beyond said third location;
   e. reversing the direction of relative movement at a fourth location and maintaining the velocity of the reversed movement unchanged until release of the tooth flanks of said one of said workpiece and said tool at said first location thereafter;
   f. increasing the velocity of said reversed movement to said first velocity and maintaining said increased velocity unchanged to the initial starting point of said relative movement.

5. The improved method according to claim 4, wherein said reversed movement takes place with reduced velocity from said third location to approximately the release of the tooth flanks at said first location.

6. The improved method according to claim 4, wherein said reversed movement starts at said fourth location with reduced velocity before said third location.

7. The improved method according to claim 5, wherein the entire reversed movement between, respectively, said fourth and first locations takes place at said reduced velocity.

* * * * *

UNITED STATES PATENT AND TRADEMARK OFFICE
CERTIFICATE OF CORRECTION

PATENT NO. : 4 119 014

DATED : October 10, 1978

INVENTOR(S) : Herbert Loos, Manfred Heckmaier and Gerhard Reichert

It is certified that error appears in the above-identified patent and that said Letters Patent are hereby corrected as shown below:

Column 5, line 60; change "axes" to ---centers---.

Column 6, line 12; change "axes" to ---centers---.

Column 6, line 15; before "total" insert ---the---.

Column 6, line 44; after "tool" insert ---approximately---.

after "location" insert ---,--- (comma).

Signed and Sealed this

Twentieth Day of February 1979

[SEAL]

Attest:

RUTH C. MASON
Attesting Officer

DONALD W. BANNER
Commissioner of Patents and Trademarks